United States Patent [19]

Denio

[11] Patent Number: 5,604,885
[45] Date of Patent: Feb. 18, 1997

[54] APPARATUS AND METHOD ENABLING A COMPUTER TO TRANSFER CONTROL BETWEEN TWO PROGRAM SEGMENTS THAT CALL ONE ANOTHER BUT OPERATE IN DIFFERENT MODES

[75] Inventor: Michael A. Denio, Sugerland, Tex.

[73] Assignee: Texas Instruments Incorporated, Dallas, Tex.

[21] Appl. No.: 649,624

[22] Filed: Feb. 1, 1991

[51] Int. Cl.$^6$ .................................................. G06F 3/00
[52] U.S. Cl. ...................... 395/500; 395/800; 364/239.3; 364/DIG. 1
[58] Field of Search ................... 395/800, 650, 395/575, 500, 425, 400, 375; 364/239.3, DIG. 1

[56] References Cited

U.S. PATENT DOCUMENTS

| | | | |
|---|---|---|---|
| 4,799,151 | 1/1989 | Iwao | 395/375 |
| 5,027,273 | 6/1991 | Letwin | 395/650 |
| 5,193,161 | 3/1993 | Bealkowski et al. | 395/400 |
| 5,257,369 | 10/1993 | Skeen et al. | 395/650 |

OTHER PUBLICATIONS

Brumm et al., 80386 – *A Programming and Design Handbook*, TPR, Professional and Reference Books, Div. Tab Books Inc., 1987, Entire Manual–371 pps.

Strauss, Edmund, 8036 *Technical Reference*, A Brady Book, N.Y., N.Y., 1987, Ch. 1, pp. 3–13, Ch. 4, pp. 51–62, Ch. 7, pp. 79–95, Ch. 14, pp. 163–175.

Glass, L. Brett, *Protected Mode*, BYTE; "Hands on Under the Hood", Dec., 1989, pp. 377–384.

Heller, Martin, *Breaking the Memory Barrier with 386/VMM*, BYTE; "Software Review", Jul., 1989, pp. 187–190.

Holtzman, Jeff, *Expanding the Limits*, BYTE; "In Depth – Life Within 1 Megabyte", Mar., 1990, pp. 205–214.

Levine, John, *386 Architecture Overcomes 286 Defects*, Microprocessor Report, Aug., 1990, pp. 6–11.

Brumm et al., "80386–A Programming and Design Handbook," TPR, Professional and Reference Books, 1987, pp. 1–27 and 127–142 and 345–365.

*Primary Examiner*—Meng-Ai T. An
*Assistant Examiner*—John E. Harrity
*Attorney, Agent, or Firm*—Robert D. Marshall, Jr.; James C. Kesterson; Richard L. Donaldson

[57] ABSTRACT

A software product and method for operating a computer, so that a first program operating in a first operating mode having a first addressing format may call code located in a second program operating in a second operating mode having a second addressing format. An argument converter converts all arguments in a stack used in inter-process communication from the first addressing format to the second addressing format. A call gate converts the desired return address into the second addressing format. Thus the called second program properly recognizes the received data and upon completion generates the correct return address.

4 Claims, 8 Drawing Sheets

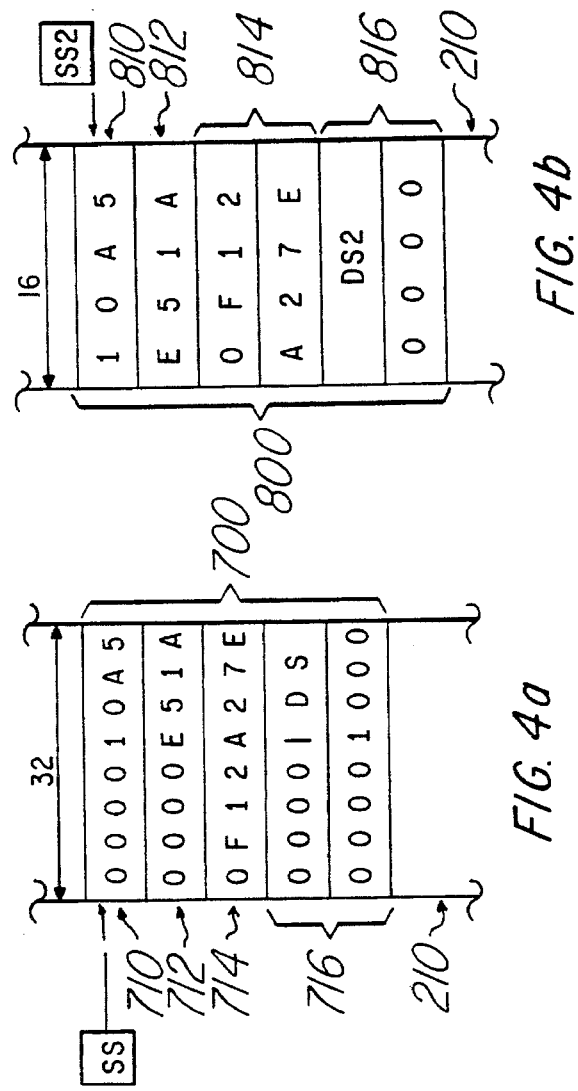
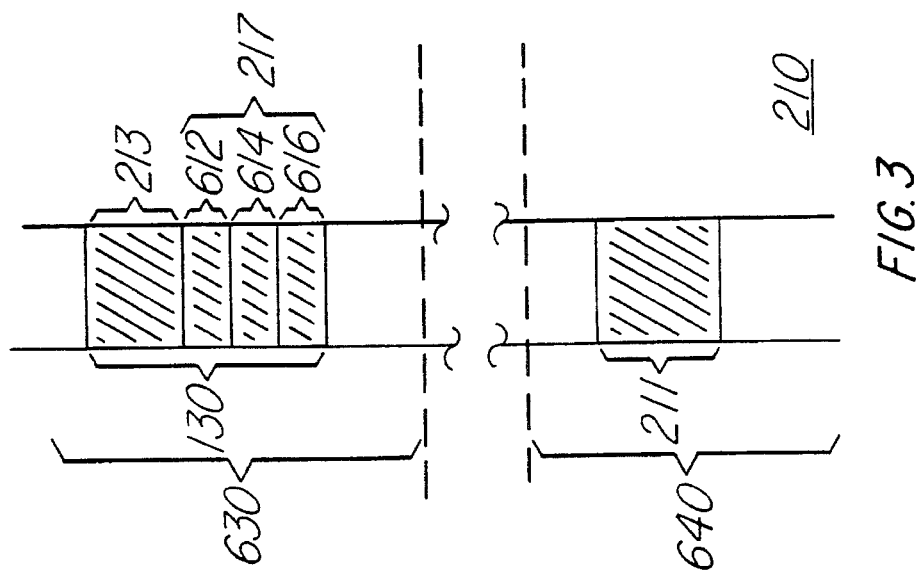
FIG. 4b
FIG. 4a
FIG. 3

APPARATUS AND METHOD ENABLING A COMPUTER TO TRANSFER CONTROL BETWEEN TWO PROGRAM SEGMENTS THAT CALL ONE ANOTHER BUT OPERATE IN DIFFERENT MODES (C) Copyright, Texas Instruments Incorporated 1990. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS-REFERENCE TO RELATED APPLICATIONS

The following coassigned patent applications are hereby incorporated herein by reference:

U.S. patent application Ser. No. 458,939 filed Dec. 28, 1989, now U.S. Pat. No. 5,109,504 entitled "GRAPHICS PROGRAM ADAPTOR";

U.S. patent application Ser. No. 420,206 filed Oct. 12, 1989, now U.S. Pat. No. 5,161,212 entitled "GRAPHICS CURSOR HANDLER";

U.S. patent application Ser. No. 420,409 filed Oct. 12, 1989, on U.S. Pat. No. 5,269,021 entitled "MULTIPROCESSOR SOFTWARE INTERFACE FOR A GRAPHICS PROCESSOR SUBSYSTEM EMPLOYING PARTIALLY LINKED DYNAMIC LOAD MODULES WHICH ARE DOWNLOADED AND FULLY LINKED AT RUN TIME";

U.S. patent application Ser. No. 420,491 filed Oct. 12, 1989, now U.S. Pat. No. 5,247,678 entitled "LOAD TIME LINKER FOR SOFTWARE USED WITH A MULTIPROCESSOR SYSTEM";

U.S. patent application Ser. No. 025,910 filed Mar. 3, 1993, now U.S. Pat. No. 5,404,519 a continuation of U.S. patent application Ser. No. 419,999 filed Oct. 12, 1989 and now abandoned;

U.S. patent application Ser. No. 025,901 filed Mar. 3, 1993, now U.S. Pat. No. 5,355,485 a continuation of U.S. patent application Ser. No. 420,440 filed Oct. 12, 1989 and now abandoned;

U.S. patent application Ser. No. 420,085 filed Oct. 11, 1989 now U.S. Pat. No. 5,261,095;

U.S. patent application Ser. No. 586,914 filed Sep. 24, 1990;

U.S. patent application Ser. No. 544,775 filed Jun. 27, 1990;

U.S. patent application Ser. No. 387,459 filed Jul. 28, 1989, now U.S. Pat. No. 5,025,407 entitled "GRAPHICS FLOATING POINT COPROCESSOR HAVING MATRIX CAPABILITIES";

U.S. patent application Ser. No. 386,850 filed Jul. 28, 1989, now abandoned;

U.S. patent application Ser. No. 387,472 filed Jul. 28, 1989, now abandoned;

U.S. patent application Ser. No. 387,455 filed Jul. 28, 1989, now abandoned.

FIELD OF THE INVENTION

This invention generally relates to a software product and method enabling a computer to transfer control between two program segments that call one another but operate in different modes.

BACKGROUND OF THE INVENTION

Without limiting the scope of the invention, its background is described in connection with transfer of control and argument passing between processes in computer systems, as an example.

Heretofore, in this field, whenever one program seeks to call an entry point in another program, such as a Terminate and Stay Resident (TSR) program, either both programs must reside in code segments for the same operating mode, or if the two programs reside in mode segments for different operating modes, a mode switch is necessary.

Both of these options are undesirable. The former, because the TSR program may be somehow related to another piece of equipment, but should be generic as to programs which are to call entry points in the TSR program. For example, if a communications driver is a TSR program which provides communication between application programs and a graphics system, and applications programs can be written in Real mode, Virtual mode and Protected mode on an Intel 80386 microprocessor, then, with the restriction that both programs operate in the same mode, there would have to be a separate and distinct communications driver TSR program for each of those modes.

However, mode switches are also undesirable. A mode switch entails changing a bit in a control register. In a mode switch to return from protected mode to real mode, the program must ensure that paging is done correctly, and it transfers control to a segment with a 64K limit. Furthermore, to safely accomplish the mode switch interrupts must be disabled, and later re-enabled, before and after the transfer of control. It is estimated that a mode switch operation presently consumes 100 micro-seconds or more. For application programs that draw complicated graphics, thousands of mode switches may be required for one picture, and would negatively impact performance. Also, there can be a limitation on the address space available to the real mode program.

SUMMARY OF THE INVENTION

Generally, and in one form of the invention is a method for operating a computer, so that a first program operating in a first operating mode may call code located in a second program operating in a second operating mode, comprising the steps of converting all arguments in a stack used in inter-program communication from the format used in the first operating mode to a format used in the second operating mode; and converting a desired return address into the format used by the second operating mode, so that the computer returns from the second program to the first program at the desired location.

In general, another form of the invention is a software product for enabling a computer to concurrently execute a first program in a first operating mode and a second program in a second operating mode, comprising an argument converter for converting arguments passed on a stack used in inter-process communication from the format used by the first operating mode to the format used by a second operating mode and a call gate connecting the first program to the second program and having a return address converter coupled to the argument converter, the return address converter comprising code which converts the return address in the first program from the format used in the first operating mode to the format used in the second operating mode.

Inventive systems and other forms of the invention are also disclosed and claimed.

An advantage of the invention is that it enables a computer to execute two programs in different operating modes, and allowing one program to make calls to subroutines located in the other program, without requiring a switch from the first program's operating mode to the second program's operating mode.

BRIEF DESCRIPTION OF THE DRAWINGS

In the drawings:

FIG. 3 is a linear representation of the host processor's memory showing an application program and a communication driver in two different mode segments.

FIG. 4(a) is a 32-bit stack used in a call from a 32-bit program.

FIG. 4(b) is a 16-bit stack used in a call to a 16-bit subroutine.

DETAILED DESCRIPTION OF PREFERRED EMBODIMENTS

Figure 1:
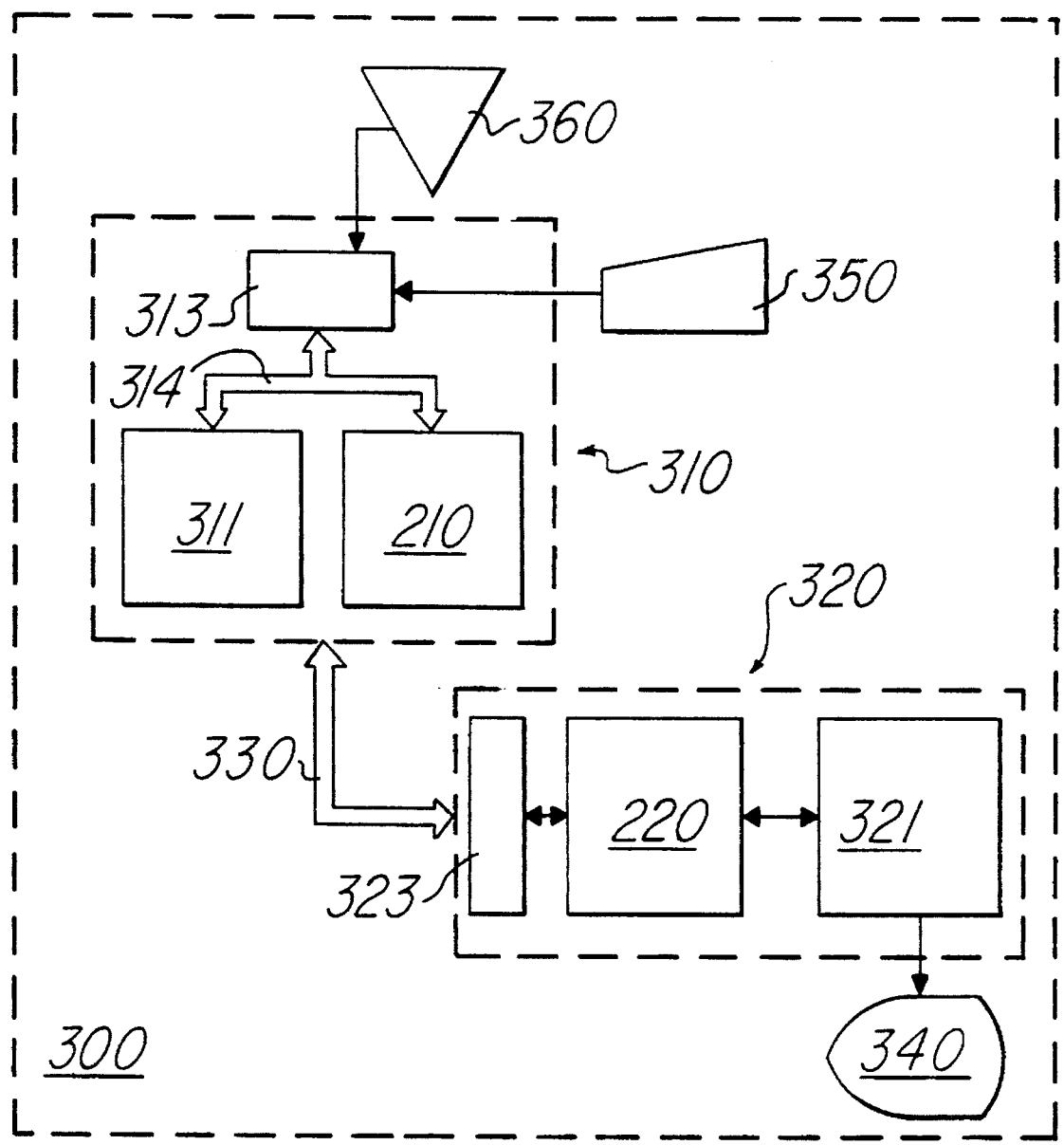
FIG. 1 is a block diagram of a multiprocessor computer system, having a host processor and a graphics processor.

FIG. 1, shows a preferred embodiment, a multiprocessor computer system 300 that has a host processor system 310 and a graphics coprocessor system 320. Among applications for such systems are high resolution graphics, such as computer aided design, desktop publishing, imaging, and presentation graphics. However, it is not a requirement that the software product and method described herein be practiced in the multiprocessor environment. In fact, a person skilled in the art will realize many possible single processor embodiments, which will be described in conjunction with FIG. 10.

Typically, host processor 311 is optimized for peripheral management. Suitable examples are the Intel 80286 and 80386 processors. These processors are used with DOS-based personal computer systems, and is but one example of suitable operating systems. In fact, the methods and mechanisms described herein may be implemented using a variety of processors and operating systems. Memory 210 associated with host processor 311 includes random access memory (RAM), which permits it to access programs that direct its operations.

Graphics processor 321 is designed for graphics processing and is programmable. Examples of such a processor are the TMS 34010 and TMS 34020 graphics system processor chips, manufactured by Texas Instruments, Inc., which is a 32 bit microprocessor with instruction set extensions for graphics processing as well as hardware for display device control and refresh tasks. Memory 220 includes RAM memory so that graphics processor 321 can store programs that instruct it how to process graphics information. A Graphics system 320 is suitably implemented as described in coassigned incorporated patent applications Ser. No. 586,914, Ser. No. 544,775, Ser. No. 386,850, now abandoned, Ser. No. 387,472, now abandoned, and Ser. No. 387,455 now abandoned.

A communication means between the two processors is embodied by bus 330 and communications buffer 323. Bus 330 is bidirectional and provides a data path and control lines. Communications buffer 323 can be accessed by both processor systems 310 and 320. Other hardware implementations of a communications buffer are also possible. Each processor 311 and 321 has access to communications buffer 323, consisting of message data for handshaking between processors, command identification space to identify the function being called, and data space to pass command arguments and additional data. The configuration shown in FIG. 1 is only one of numerous means for providing interprocessor communications. Furthermore, although FIG. 1 shows the two processor systems, 310 and 320, as having separate memories 210 and 220, the communications circuitry may have a shared memory.

Multiprocessor system 300 of FIG. 1 operates with various standard peripheral devices, notably a display 340, mass storage 350, and input devices 360, such as a keyboard or mouse. An I/O circuit 313 is used to communicate information in appropriate form between these input and output devices and the other parts of host system 310, via a host system bus 314. Input devices 360 permit a user to interact with the host processor system 310. Display 340 is coupled to graphics processor 321 via a VRAM and a palette for example.

The preferred embodiment single processor environment hardware configuration is the same as host processor system 310, and the peripheral devices 360 and 350 connected thereto, without being connected to a coprocessor. An example of a use of the software product and method in the single processor environment is a device driver which is implemented as a program through which an application program interfaces to the device.

Figure 2:
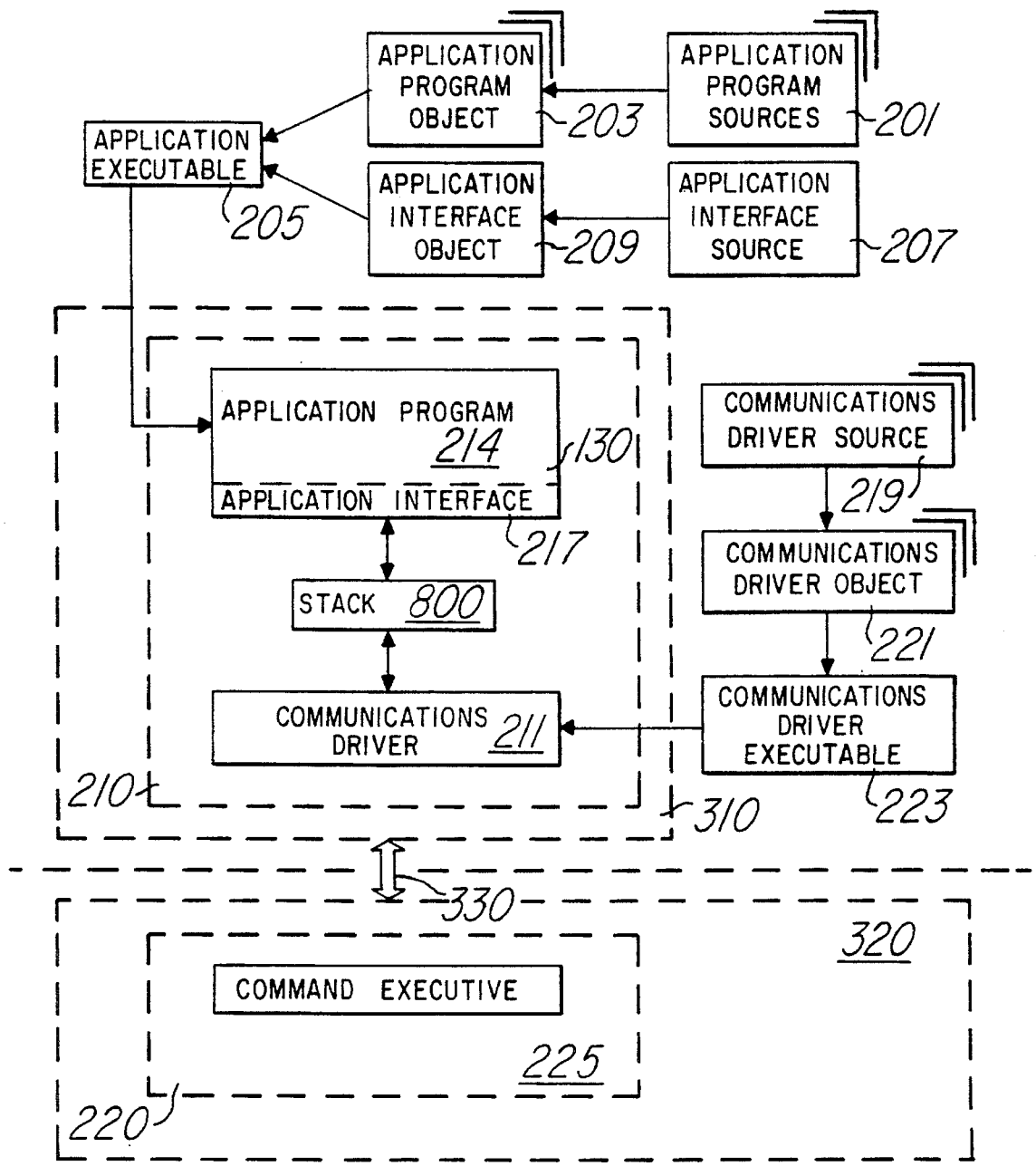
FIG. 2 is a block diagram showing various programs resident in respective memories of the host and graphics processors.

FIG. 2 depicts various pieces of software resident in memories 210 and 220. Memory 210 contains applicaton program 130 and communications driver 211. Communications driver 211 is a terminate and stay resident program (TSR). A TSR is a program which after loading and executing remains resident in memory 210 and which may further execute via calls from a separate and distinct program, such as application program 130.

Application program 130 and communications driver 211 are separate and distinct programs which communicate with one another via stack 800.

Application program 130 originates from application program sources 201 and applications interface source 207. For high level language, for example C, application program sources, application program sources 201 is compiled into application program objects 203. For assembly language sources, application program sources are assembled into application program objects 203. Application interface source 207 is similarly translated, by compilation or assembly, into application interface object 209.

Application program object files 203 and application interface object files 209 are linked together to form one executable file, application executable file 205, which is loaded into memory 210 as application program 130.

FIG. 2 further shows that application program executable image 130 consists of component 214 corresponding to application program sources 201 and component 217 corresponding to application interface sources 207.

It should be apparent to a person skilled in the art that the translation and/or linking steps can be accomplished externally to computer system 300, and can be installed thereon through one of the peripheral devices, for example input device 360. That installation may be done either of source files 201 and 207, or object files 203 and 209, or executable file 205, or any combination thereof.

The communications driver goes through a similar transformation. Its source files 219 are either compiled or assembled, depending on whether they are written in a high-level language or in assembly language, into communications driver executable file 223.

Communications driver executable file 223 is loaded into memory 210 as communications driver executable image 211. Stack 800, which may be a portion of memory 210, provides interprogram data transfer between application program 130 and communications driver 211.

Communications driver 211 communicates via bus 330 with command executive 225 in memory 220 on graphics coprocessor 320. This communications is further described in U.S. patent application Ser. No. 420,409, U.S. Pat. No. 5,247,678, U.S. patent application Ser. No. 25,910, U.S. Pat. No. 5,404,519, and U.S. patent application Ser. No. 420,085, now U.S. Pat. No. 5,261,045.

Some computers operate in multiple operating modes. One utility of which is emulation, that is, one computer's ability to execute programs written for another. The Intel 80386 is an example of such a computer. It operates in either Real mode, Virtual mode or Protected mode. While the preferred embodiment involves Real and Protected mode, an alternative embodiment would include Virtual mode and any operating mode on computers other than the Intel 80386.

The 80386 starts operating in Real mode, a 16-bit mode compatible with early Intel processors, such as the 8086. It may then be switched into Protected mode, a 32-bit mode which derives its name from certain protection features implemented to avoid certain types of errors. Detailed discussion of the various operating modes may be found in Edmund Strauss, 80386 *Technical Reference, Brady Books*, 1987. However, note that programs are typically written to operate exclusively in one mode.

FIG. 3 shows a linear representation of memory 210, with applications program 130 stored in one section and communications driver 211 stored in another.

Applications program 130 and communications driver 211 are distinct programs and need not be written for the same mode. Thus, the situation arises where applications program 130 and communications driver 211 operate in incompatible modes. FIG. 3 illustrates an example of this situation. Memory 210 is partitioned into code segments for real mode 640 and for protected mode 630. Communications driver 211 is a real mode program residing in real mode code segment 630 and applications program 130 is a protected mode program residing in protected mode code segment 640.

The Intel 80386 microprocessor allows a program to make calls to entry points in other programs, much like subroutine calls are normally made in computer programs. Thus, application program 130 is able to call routines in communications driver 211. The interprogram communication is achieved by means of a stack. FIGS. 4(a) and 4(b) illustrates two examples of calling stacks. FIG. 4(a) shows a section of memory 210, as it would be viewed by a protected mode program. Stack pointer SS "points" to a section of memory 210 which contains calling stack 700. A protected mode program views memory as being 32 bits wide. Consequently, the calling stack is implemented using 32-bit words, which is the stack that application program 130 produces prior to transfer to communications driver 211.

Stack 700 contains an argument list having two short words, a long word and a pointer. The argument stack, in locations 710 and 712, contains two values which contain values which fit within 16 bits. Those values are nevertheless stored in two 32 bits locations, with the high order bits being all 0 or undefined. Memory location 714, on the other hand, contains a numeric value which requires more than 16 bits. Finally, element 716 is a pointer, which in protected mode requires 48 bits, thus requiring two 32-bit memory locations.

In real mode, a 16-bit mode, memory is viewed as being 16 bits wide. Thus, stack 800 in FIG. 4(b), is 16 bits wide, which is the type of stack communications driver 211 illustrated expects. Memory locations 810 and 812 both store information sufficiently small to be represented by 16 bits. Element 814 is two memory locations in the stack and store a piece of information large enough to necessitate using 32 bits. It corresponds to element 714 in 32 bits stack 700. Finally, element 816 is a pointer. In the case of 16-bit real mode, pointers are 32-bit data structures consisting of a 16-bit selector and a 16-bit offset as illustrated in FIG. 5.

Figure 5:
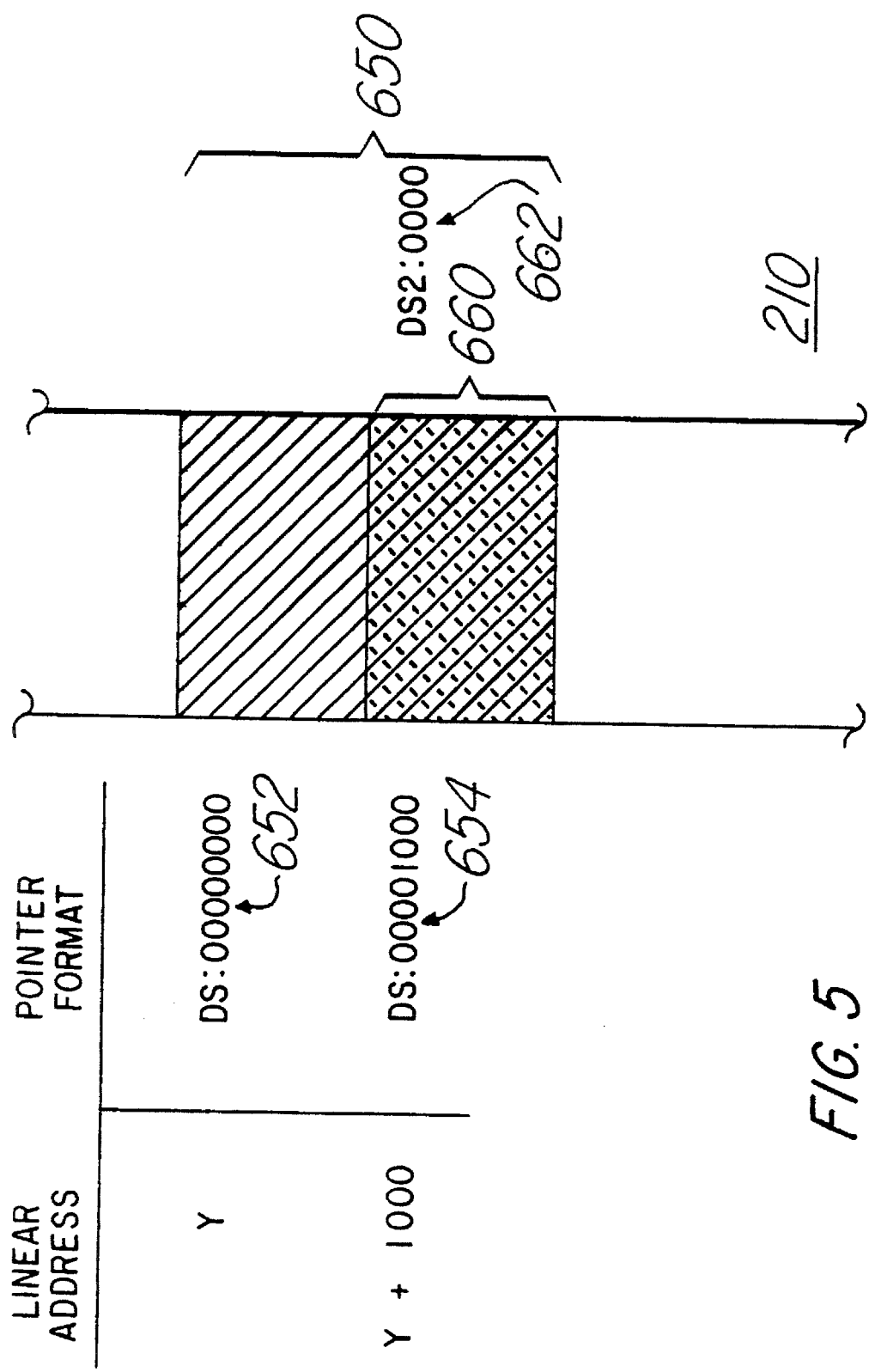
FIG. 5 illustrates two overlapping code segments in the host processor and pointers to those code segments.

FIG. 5 illustrates another portion of memory 210. Region 650 is a continuous linear block of memory called a segment. There are two types of segments, data segments and code segments. The memory of an Intel 80386 may contain many thousands of segments. A particular segment is addressed through a data structure called a selector, which identifies one of the many segments. In FIG. 5, DS and DS2 are selectors which identify segments in memory 210 starting at linear addresses Y and Y+1000, respectively.

A pointer is a combination of a selector and an offset. In the two memory locations that make up pointer 716, the first 16 bits of the first of these two locations have an undefined contents, as they are not used in the pointer. The second half, the low order 16 bits, on the other hand contains a selector. The second memory location contains a 32-bit offset, which is used as an index within the segment selected by the selector. Referring again to FIG. 5, elements 652 and 654 are both 48-bit pointers, as used by 32-bit protected mode. They share selector DS, but have different offsets, 0 and 1000, respectively. Element 662, on the other hand, is a 32-bit pointer which is used by 16-bit mode. It points to the same location as element 654.

A program, or program segment, which expects a 16-bit stack such as stack 800, encounters a problem that in popping words off the stack 700, the program operating in 16-bit real mode pops 16 bits at a time, whereas the words had been written 32 bits at a time. Thus, if stacks 700 and 800 represent an argument list in a call from program segment 130 operating in 32-bit protected mode to program segment 140 operating in 16-bit real mode, and the argument list has two 16-bit arguments, and one 32-bit argument and one pointer, then the 16-bit program segment would pop off '0000' and '10A5' as its first two arguments rather than the desired '10A5' and 'E51A'. Similarly, the differing pointer formats would cause a problem, for example, if the pointer was the return address, the called routine would not return to the proper location in the calling program.

Figure 6:
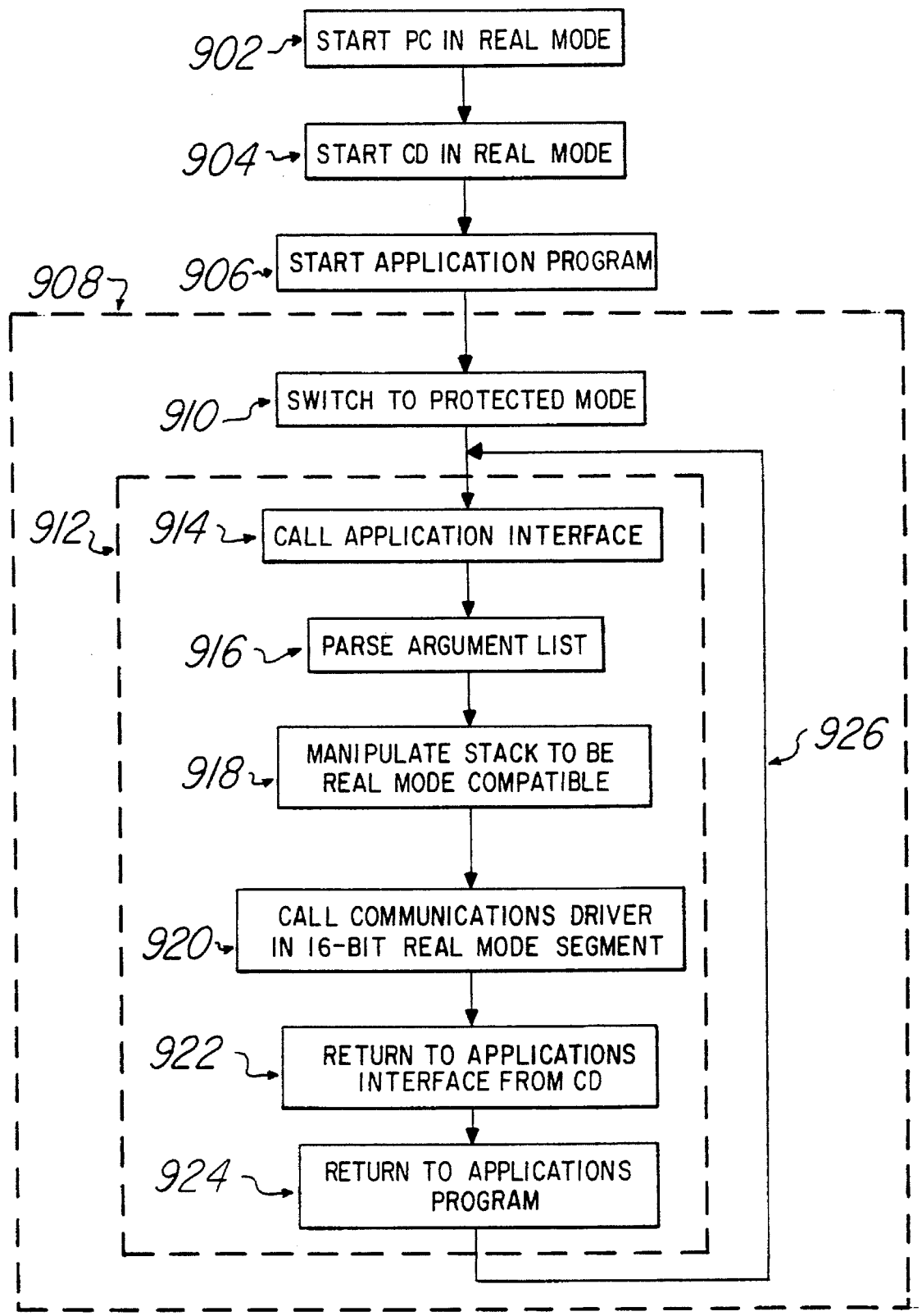
FIG. 6 is a flow diagram of a method for calling an entry point in a 16-bit code segment from a 32-bit code segment.

The method of FIG. 6 advantageously operates when a called program segment has incompatible stack widths and pointer formats with respect to the calling program segment.

One method of achieving the desired result is by means of a mode switch for every call to communications driver 211. However, that is a very time consuming operation, consisting of converting arguments, copying the stack, and in the case of graphics systems prevents reasonable rates of picture drawing. Furthermore, in the case of the Intel 80386, due to a restriction in the DOS operating system, there is the additional problem that upon a mode switch to real mode, the called routine cannot access memory above the 1 Meg boundary.

FIG. 6 illustrates a second method for achieving the desired result. It should be noted that FIG. 6 shows only one order in which the steps may be executed, other sequences are also possible.

Step 902 shows the initialization step. The Intel 80386 (PC) starts its operation in 16-bit real mode. Communication Driver (CD) is then started, in step 904, either by means of an initialization procedure or from a program. Communications Driver 211 is a Terminate and Stay Resident (TSR) program, and as such is not removed from memory after it has executed. Furthermore, because it remains in memory it may be called from other programs.

Step 906 initiates the execution of application program 214, which would cause it to be loaded into memory 210 as program segment 130, some of whose steps are encompassed by box 908. One of the initial steps is step 910, to switch the processor into protected mode. After that initial mode switch the processor remains in protected mode without requiring further mode switches. However, it is also possible to switch the processor into protected mode prior to step 906, i.e., before starting the execution of application program 214.

Box 912 constitutes the steps which make up the inner-loop in the application program. It includes steps for each call to Communications Driver 211. The steps of 912 of FIG. 6 assumes that Application program 214 and Communications Driver 211 reside in different mode segments. If the two programs reside in the same mode segment steps 910, 914, 916 and 918 would not be required. Furthermore, the call to the communications driver in step 920 would be a call to a mode segment of the same type as the mode segment in which the calling program resides.

Step 914 is a call to a routine in the applications interface 217. Each entry point in Communications Driver 211 has a corresponding subroutine in applications interface 217.

Steps 916 and 918 carry out the conversion of the calling stack from 32-bit format to 16-bit format. Step 916, to parse the argument list, is executed when the data types and number of arguments of the called routine is not known. An example, from the programming language C, is the "printf" routine. "printf" is used for formatted output to some output device. The arguments to the routine are the formats and the data to be printed, and there is no restriction on the number of arguments and the data type of the arguments. However, in the case of most subroutines the number and data type of the arguments are fixed, and the parsing step is not necessary.

There is no limitation on the data types that may be used as arguments, however, in the preferred embodiment arguments include short words (S) which are 16 bits long, long words (L) which are 32 bits long, and pointers (P) which have the format described above. Each entry-point in Communications Driver 211 is characterized by its argument list type, that is the concatenation of the data types of all its arguments. For example, if a routine expects four arguments, a short word, another short word, a long word, and a pointer, then its argument list type is SSLP. This the case of stack 700 if FIG. 4(*a*).

Figure 7:
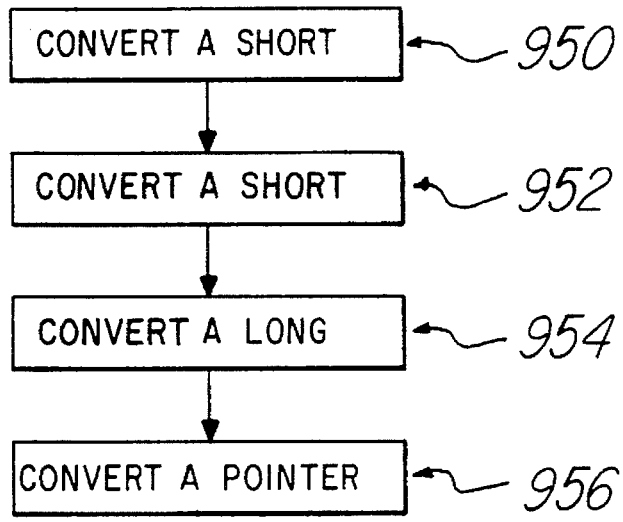
FIG. 7 is a flow diagram of a method for converting a particular argument stack.

Step 918 builds an alternative calling stack. In the preferred embodiment, there is a distinct stack conversion method for each argument list type. For example, conversion method for the SSLP argument list type, is illustrated in FIG. 7. Step 950 converts the first argument, a short word, step 952 converts the second argument, another short word, step 954 converts the third argument, a long word, and step 956 converts the fourth argument, a pointer.

Short word conversion entails copying the low order 16 bits into the alternative calling stack. Long word conversion requires copying the high order 16 bits and the low order 16 bits into two successive 16-bit locations in the alternate calling stack.

Figure 8:
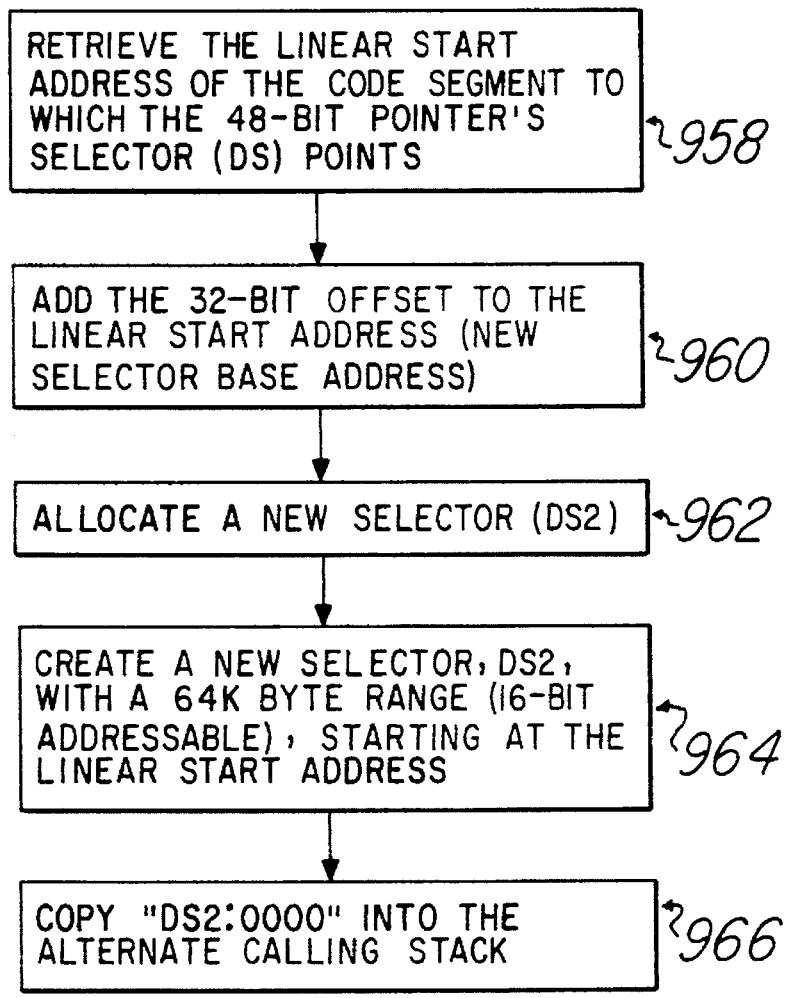
FIG. 8 is a flow diagram of a method for converting a 48-bit pointer into a 32-bit pointer.

However, pointer conversion is more involved. It is shown in FIG. 8. Basically it computes the linear address to which the 48-bit pointer points (recall that 32-bit protected mode uses 48-bit pointers and 16-bit real mode uses 32-bit pointers), creates a new selector which points to that address, and copies a 32-bit pointer using the new selector and an offset of zero into the alternate calling stack. Thus, pointer conversion commences with step 958, retrieving the linear start address of the code segment to which the 48-bit pointer's selector points. FIG. 5 illustrates two overlapping code segments in memory 210. Pointer 652 is the combination of selector DS and offset 0000 0000. Thus, it points to the base address of the segment selected by means of selector DS. In calling stack 700 in FIG. 4(*a*), memory element 716 is a pointer with selector DS and offset 0000 1000 (DS:0000 1000). The code segment pointed to by pointer 654 which is stored in memory element 716 is the segment selected by selector DS, has base address DS:0000 0000, associated with which is some linear address, Y, which is the address step 958 retrieves.

Step 960 adds the 32-bit offset to linear address Y. In pointer 654 from calling stack 700 at location 716 the offset is 0000 1000. Thus, the result from step 960 is Y+0000 1000, which also is the linear address pointed to by pointer 654.

Step 962 allocates a new selector DS2. For the sake of efficiency, the application program may during initialization allocate a number of selectors for internal allocation during program execution.

Step 964 creates new selector DS2 for a code segment with a 64K byte range. Each byte in memory is one addressable unit. Therefore, because a 16-bit number has a value for 0 to 64K-1, a 16-bit offset can address a range of 64K bytes. The target of the pointer conversion is a 32-bit pointer having 16 bits of selector and 16 bits of offset. For that reason the new selector is created with a 64 K byte range. Furthermore, step 964 creates new selector DS2 so that it points to a code segment starting at linear address Y+0000 1000, the new selector base address, which is shown as code segment 660 in FIG. 5. As can be seen in FIG. 5, DS2:0000 and DS:0000 1000 point at the same linear address.

Finally, step 966 concatenates the new selector and a zero offset to create a 32-bit pointer the contents of which is "DS2:0000". Step 966 also copies that 32-bit pointer into the alternate calling stack.

Thus, carrying out the method of FIGS. 6 and 7 on 32-bit stack 700 in FIG. 4(*a*) creates stack 800 in FIG. 4(*b*). Advantageously, the method is applicable to any of the myriad of possible calling stacks.

Figure 9:
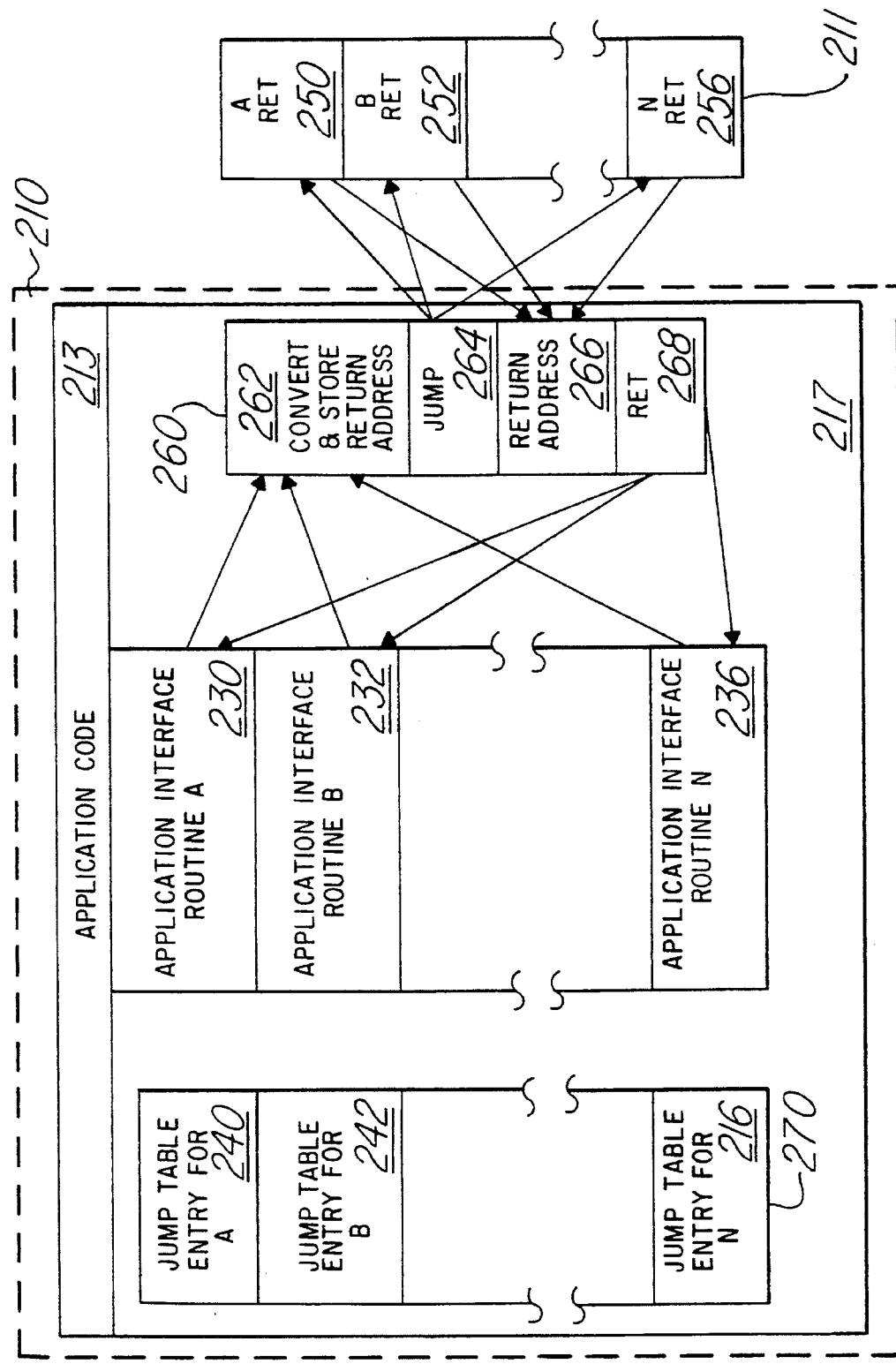
FIG. 9 is a block diagram of data flow between various components in the application interface and the flow of control between application interface header routines, a call gate, and the communications driver.

A further problem in calling an entry-point in a 16-bit real mode code segment from a program operating in a 32-bit protected mode code segment is to ensure that the program returns to the proper location when returning from the 16-bit routine. FIG. 9 is an alternative view of applications program 210 and communications driver 211. Communications driver 211 consists of a number of routines, for example those illustrated as blocks 250, 252, and 256. Each routine in communications driver 211 has an entry-point which is externally callable, for example, A, B, and N in FIG. 9. Furthermore, for each routine in communications driver 211 there is a corresponding entry in jump table 270. Jump table 270 provides the address of the entry point for each routine in communications driver 211. Also for each routine in communications driver 211 there is a corresponding routine in applications interface 217. Thus, for routine 250, there is entry point A, jump table entry 240, and application interface routine 230.

To cause the execution of a routine in communications driver 211 application code 214 calls a routine in applications interface 217, for example routine 230. The applications interface routine in turn looks up the address of the corresponding entry point in jump table 270. With the retrieved address it calls call gate 260, a special routine in applications interface 217, which processes all calls from application program 214 to communications driver 211. Call gate 260, in step 262, converts return address 266 into the format for return addresses used by communications driver 211. The linear address of the desired return address is known because it is the first instruction after jump instruction 264 and it is the same for all calls to communication driver 211 which are made through call gate 260. After converting return address 266 step 262 stores it onto the alternate calling stack. Step 264 causes the actual transfer of execution to communications driver 211 by means of JUMP instruction 264, which takes the retrieved entry-point address and transfers execution to it. Note that this differs from the way subroutine calls are usually made in that the calling stack are created by the program itself and the JUMP is explicitly made whereas in most subroutine calls the CALL instruction automatically creates the stack and execution transfer.

Following step 264 control is transferred to the entry-point in communications driver 211. The computer executes the routine associated with the entry-point, at the end of which is a return instruction. The RET instruction causes the computer to obtain the return address as converted by step 262 and transfer control back to call gate 260 at return address 266.

Call gate 260 terminates with step 268, a RET instruction, which transfers control back to the calling application interface routine, which in turn transfers control back to application code 214.

Figure 10:
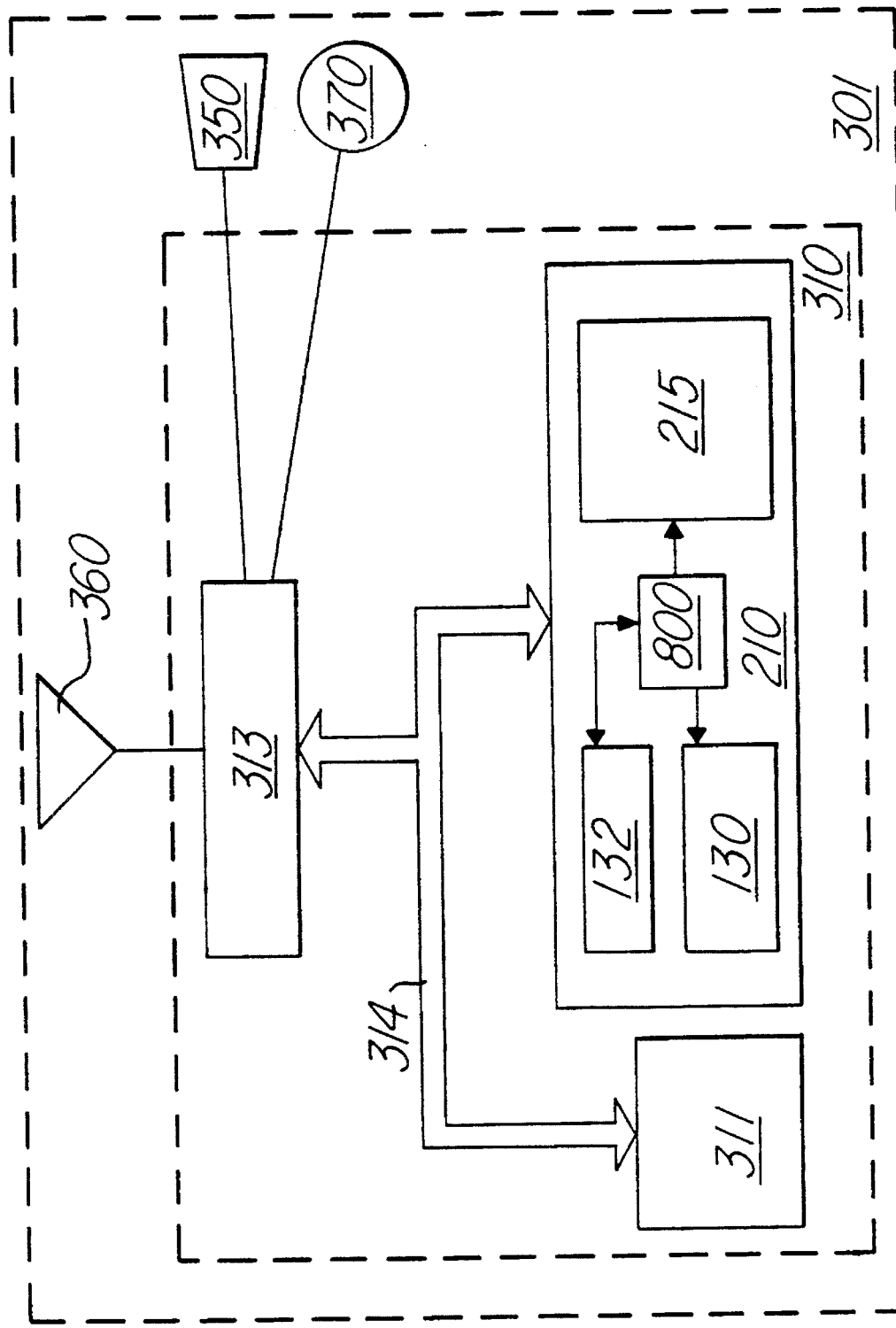
FIG. 10 is a block of single processor computer systems.

While the preferred embodiment has been described in reference to multiprocessor environment 300 wherein application program 130 calls routines in communication driver 211 for inter-processor communication, the software product and method which enables application program 130 and the communication driver 211 to reside in different mode segments is also applicable to a single processor environment in which two separate and distinct programs residing in different mode segments communicate with each other. An example of such a system is shown in FIG. 10. System 301 is a single processor system containing computer system 310 and peripheral devices 350, 360 and 370. Computer 310 contains processor 311 and memory 210. In addition to devices 350 and 360, of FIG. 1, system 310 is connected to light pen 370. Memory 215 contains at least two programs, application program 130 and light pen interface program 215. Application program 130 contains subroutine calls to read input from the light pen. Those calls are made via light pen interface program 215 which acts as a device driver for light pen 370. Communication between application program 130 and light pen interface program 215 is accomplished via stack 800. As in the case of communications driver 211, discussed above, if light pen interface program 215 and application program 130 reside in different mode segments, the method of FIGS. 6, 7, 8 and 9, solves the problems of inter-mode communication. If light pen interface program 215 is a TSR program it stays resident in memory and a second application program 132 may access it. Although both application program 130 and application program 132 make calls to light pen interface program 215, they do not necessarily operate in the same mode. Application interface 217 makes the conversions described in conjunction with FIGS. 6, 7, 8 and 9 as applicable to communicate between an application program executing in a mode different from the mode in which light pen interface program 215 executes.

A few preferred embodiments have been described in detail hereinabove. It is to be understood that the scope of the invention also comprehends embodiments different from those described, yet within the scope of the claims.

For example, color display devices can be raster-scanned cathode ray tubes or other raster-scanned devices; devices that are not raster-scanned and have parallel line or frame drives; color printers, film formatters, or other hard copy displays; liquid crystal, plasma, holographic, deformable micromirror, or other displays of non-CRT technology; or three-dimensional or other devices using nonplanar image formation technologies.

"Microcomputer" in some contexts is used to mean that microcomputer requires a memory and "microprocessor" does not. The usage herein is that these terms can also be synonymous and refer to equivalent things. The phrase "processing circuitry" comprehends ASICs (application specific integrated circuits), PAL (programmable array logic), PLAs (programmable logic arrays), decoders, memories, non-software based processors, or other circuitry, or digital computers including microprocessors and microcomputers of any architecture, or combinations thereof. Words of inclusion are to be interpreted as nonexhaustive in considering the scope of the invention.

Internal and external connections can be ohmic, capacitive, direct or indirect, via intervening circuits or otherwise. Implementation is contemplated in discrete components or fully integrated circuits in silicon, gallium arsenide, or other electronic materials families, as well as in optical-based or other technology-based forms and embodiments. It should be understood that various embodiments of the invention can employ or be embodied in hardware, software or microcoded firmware. Process diagrams are also representative of flow diagrams for microcoded and software based embodiments.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for operating a computer, so that a first program operating in a first operating mode having a first memory addressing format may call code located in a second program operating in a second operating mode having a second memory addressing format without changing operating mode, said method comprising the steps of:

converting all arguments in a stack used in inter-program communication from said first memory addressing format used in said first operating mode to said second memory addressing format used in said second operating mode; and converting a desired return address into said second memory addressing format used by said second operating mode, so that said computer returns from said second program to said first program at said desired return address.

2. A computer system, comprising:

a central processing unit (CPU) which can operate in a first operating mode having a first memory addressing format and in a second operating mode having a second memory addressing format;

an input-output (I/O) circuit connected to said CPU;

a mass storage device connected to said I/O circuit;

a data input device connected to said I/O circuit; and a memory connected to said CPU and partitioned into a first mode segment and a second mode segment, said memory having a first program stored in the first mode segment and a second program stored in the second mode segment;

said first program comprising a first code portion and a stack converter enabling the central processing unit to transfer execution from said first program to said second program without switching from said first mode to said second mode, wherein said stack converter comprises an argument converter for converting arguments passed on a stack used in inter-processor communication from said first memory addressing format to said second memory addressing format, a return address converter for converting a desired return address into said second memory addressing format used by said second operating mode, so that said computer returns from said second program to said first program at said desired return address, and a call gate for transferring control to a callable entry point in said second program.

3. A computer implemented method for enabling a first computer process operating in a first operating mode having a first memory addressing format to communicate with a second computer process operating in a second operating mode having a second memory addressing format without changing operating mode, comprising:

linking an applications interface into the program corresponding to said first computer process and including detecting a communication between said first computer process and said second computer process including detecting an argument list and detecting a return address via a call gate;

converting each type argument of said detected argument list from said first memory addressing format used by said first operating mode into said second memory addressing format used by said second operating mode;

converting said detected return address into said second memory addressing format used by said second operating mode;

storing a jump table having entries for callable entry points in said second computer process;

transferring control to one of said callable entry points in said second computer process and specified by an entry in said jump table completion of a routine in said second computer process performing said second computer process; and transferring control back to said first computer process via a return instruction.

4. A method enabling a computer to provide interprocess communication between a first process operating in a first operating mode having a first memory addressing format and a second process operating in a second operating mode having a second memory addressing format without changing operating mode, said method comprising the step of:

converting all arguments passed from said first process to said second process from said first memory addressing format used by said first operating mode to said second memory addressing format used by said second operating mode.

* * * * *